UNITED STATES PATENT OFFICE 2,415,454

METHOD OF SEPARATING 1,1,3-TRIMETHYL-CYCLOPENTANE FROM DIISOBUTYLENE

Arthur C. Whitaker, Oakmont, Pa., assignor to Gulf Research & Development Company, Pittsburgh, Pa., a corporation of Delaware No Drawing. Application December 30, 1944, Serial No. 570,760

2 Claims. (Cl. 260—666)

The present invention is concerned with the treatment of the crude product resulting from the cyclomerization of isobutylene and consisting primarily of 1,1,3-trimethylcyclopentane and diisobutylene, for the purpose of separating the latter therefrom.

When isobutylene is subjected, for example in a high-pressure bomb or in a continuous polymerization apparatus, to a temperature within the range of 400–600° C. at a pressure within the range of 300–5000 pounds per square inch for a period of time which, depending upon the other conditions employed, may vary from several minutes to a few hours, cyclomerization (i. e., polymerization to a product which is cyclic in nature) and linear polymerization (to products of the type of diisobutylene) take place. At the relatively lower pressures, the product of the thermal treatment contains mainly 1,1,3-trimethylcyclopentane and diisobutylene.

A primary object of the present invention is to realize the efficient separation of acyclic polymer from the product of the thermal treatment whereby relative purification of the cyclomer takes place, while simultaneously dipolymerizing the acyclic polymer to produce isobutylene in such form that it may be directly re-used in the cyclomerization operation.

It has now been found that when a mixture of polymeric compounds resulting from a thermal treatment of isobutylene, as above described, is passed over an activated clay, such as, fuller's earth, attapulgus clay, Floridin, Georgia clay, infusorial earth or the like at a temperature of about 350° to 450° C., a selective depolymerization of the diisobutylene present, to isobutylene takes place, and the isobutylene after separation from the cyclic polymer may be recycled to the cyclomerization process. This observation provides the means for the realization of the aforesaid primary object of this invention. The hot activated clay treatment is specific to the diisobutylene so that the 1,1,3-trimethylcyclopentane is unaffected under these conditions and remains behind as a relatively pure product.

Other objects and advantages of the present invention will be evident from the following detailed description of presently-preferred illustrative embodiments thereof in which fuller's earth was used as the depolymerizing clay.

PREPARATION OF 1,1,3-TRIMETHYLCYCLOPENTANE

Isobutylene is thermally polymerized in a continuous polymerization apparatus. Liquid isobutylene is forced first through a preheater at 200–250° C. and then into a reaction zone where it is held at 425° C. under a pressure of 500 pounds per square inch for 30 minutes. The product, after leaving the reactor, is condensed at atmospheric pressure, collected and weathered to remove dissolved isobutylene. The liquid polymer is then roughly fractionated through a 10-inch Hempel column; that portion coming over between 95° and 128° C. is collected. The crude material collected between 95° and 128° C. is then fractionated through a 20-plate column and that coming over between 100° and 110° C. is then taken for treatment. Pure 1,1,3-trimethylcyclopentane boils at 105° C.; its refractive index at 20° C. is 1.4109.

The conditions of polymerization and the yields obtained in two runs are shown in Table I.

Table I

|  | 1 | 2 |
|---|---|---|
| Run No. | | The products of these two runs were combined |
| Time, minutes | 30.6 | 28.5 |
| Temperature, ° C | 425 | 425 |
| Pressure, lbs./sq. in. | 500 | 500 |
| Isobutylene charged, grams | 1,492.0 | 1,815.0 |
| Liquid product (weathered), grams | 497.8 | 558.0 |
| Per cent by wt. based on isobutylene charged | 33.3 | 30.8 |
| Liquid product: | | |
| Per cent by weight to 100° C. (78.4 g.) | | 2.4 |
| Per cent by weight 100–110° C. (550 g.) | | 16.6 |
| Per cent by weight above 110° C. (304.6 g.) | | 9.2 |
| Per cent by weight loss (122.8 g.) | | 3.7 |

PURIFICATION OF THE 100–110° C. FRACTION

The 100–110° C. fraction consists mainly of 1,1,3-trimethylcyclopentane and diisobutylene. A trace of other olefinic material and some isoparaffins may also be present. Diisobutylene, however, is the chief impurity, and the purification treatment of this invention is primarily concerned with its removal.

The 100–110° C. fraction may then be fed continuously through a heated iron tube at atmospheric pressure. In the middle of the iron tube are disposed 100 ml. of 16–30 mesh fuller's earth supported by glass wool and previously activated by heating the furnace to 400° C. and passing nitrogen through it for one-half hour. The 100–110° C. fraction is passed over the fuller's earth at a temperature of 350–450° C. In Table II there are summarized the data of three illustrative runs carried out at 400° C. at different space velocities (liters of raw polymer per liter of catalyst per hour), fresh activated fuller's earth being used in each run.

The product of each run is condensed and the isobutylene and the 1,1,3-trimethylcyclopentane may be separately recovered. The 1,1,3-trimethylcyclopentane fraction may then be carefully fractionated through a 20-mesh plate column to effect removal of other olefinic materials and isoparaffins that may be present. The portion boiling between 104 and 106° C. or a narrower cut portion may be taken as a purified 1,1,3 - trimethylcyclopentane. By taking the bromine number, the amount of remaining unsaturated hydrocarbons present in the purified product may be calculated.

It is manifest from the data of Table II that the passage over fuller's earth at 400° C. is effective in removing diisobutylene contaminating the cyclic polymer obtained by the thermal polymerization of isobutylene. The bromine number of the 104–106° C. cut from the raw material has, for example, been reduced from 12.2 to 1.3, or in terms of percent unsaturates from 8.7 to 0.9. The temperature of the treatment may range from 350–450° C.

Table II

| Run No. | Raw 100–110° C. charged | 2 | 3 | 4 |
|---|---|---|---|---|
| Space velocity | | 0.55 | 0.34 | 0.13 |
| Length of run, hours | | 2.0 | 1.6 | 6.1 |
| 100–110° C. fraction charged: | | | | |
| Weight, g | 74.1 | 86.2 | 43.0 | 61.5 |
| Volume, ml | 100.0 | 109.5 | 54.5 | 82.0 |
| Bromine number | 19.4 | (Note.—Each run was carried out at 400° C. with 100 ml. (45.0 g.) of fuller's earth.) | | |
| Refractive index, $n_D^{20}$ | 1.4130 | | | |
| Per cent unsat. (calc.) | 13.6 | | | |
| 104–106° C. fraction— | | | | |
| Weight, g | [1] 49.8 | | | |
| Per cent (wt.) | 67.4 | | | |
| Volume, ml | [1] 68.2 | | | |
| Bromine number | 12.2 | | | |
| Refractive index $n_D^{20}$ | 1.4128 | | | |
| Per cent unsat. (calc.) | 8.7 | | | |
| Liquid product recovered: | | | | |
| Weight, g | | 76.6 | 38.8 | 55.2 |
| Volume, ml | | 103.0 | 52.0 | 73.5 |
| Per cent (wt.) of charge | | 89.1 | 90.4 | 89.7 |
| Bromine number | | 12.4 | 11.9 | 10.6 |
| 104–106° C. fraction— | | | | |
| Weight, g | | 52.6 | 25.4 | 35.6 |
| Volume, ml | | 70.1 | 33.8 | 47.5 |
| Per cent (wt.) of charge | | 61.1 | 59.1 | 57.9 |
| Bromine number | | 2.9 | 2.5 | 1.3 |
| Refractive index, $n_D^{20}$ | | 1.4116 | 1.4116 | 1.4116 |
| Per cent unsat. (calc.) | | 2.0 | 1.8 | 0.9 |

[1] On the raw material (100–110° C.) the plateau was from 104–106.6° C.

What I claim is:

1. A method of separating 1,1,3-trimethylcyclopentane from diisobutylene, comprising contacting a mixture containing 1,1,3-trimethylcyclopentane and diisobutylene with activated clay at a temperature of 350° to 450° C. for a time sufficient to depolymerize the diisobutylene, and subsequently separating the 1,1,3-trimethylcyclopentane from the resultant isobutylene.

2. A method of separating 1,1,3-trimethylcyclopentane from diisobutylene, comprising contacting a mixture containing 1,1,3-trimethylcyclopentane and diisobutylene with activated fuller's earth at a temperature of 350° to 450° C. for a time sufficient to depolymerize the diisobutylene, and subsequently separating the 1,1,3-trimethylcyclopentane from the resultant isobutylene.

ARTHUR C. WHITAKER.

REFERENCES CITED

The following references are of record in the file of this patent:

UNITED STATES PATENTS

| Number | Name | Date |
|---|---|---|
| 2,212,112 | Clausen | Aug. 20, 1940 |
| 1,981,819 | Wiezevich | Nov. 20, 1934 |
| 2,111,831 | Batchelder et al. | Mar. 22, 1938 |

OTHER REFERENCES

Zelinskii et al., J. Russ. Phys. Soc. 45, 831–42; Ber 46, 1466–74; C. A. 7, 3600. Day et al., J. Chem. Soc. (1935) 1063–5; C. A. 29, 7294. Dunstan, Science of petroleum, vol. 3, 2027 (1938). (Copy in Div. 31.)